July 4, 1967
A. C. TETER ETAL
3,329,626
ACTIVATED FURNACE CARBON BLACK PRODUCTION
Filed March 22, 1965
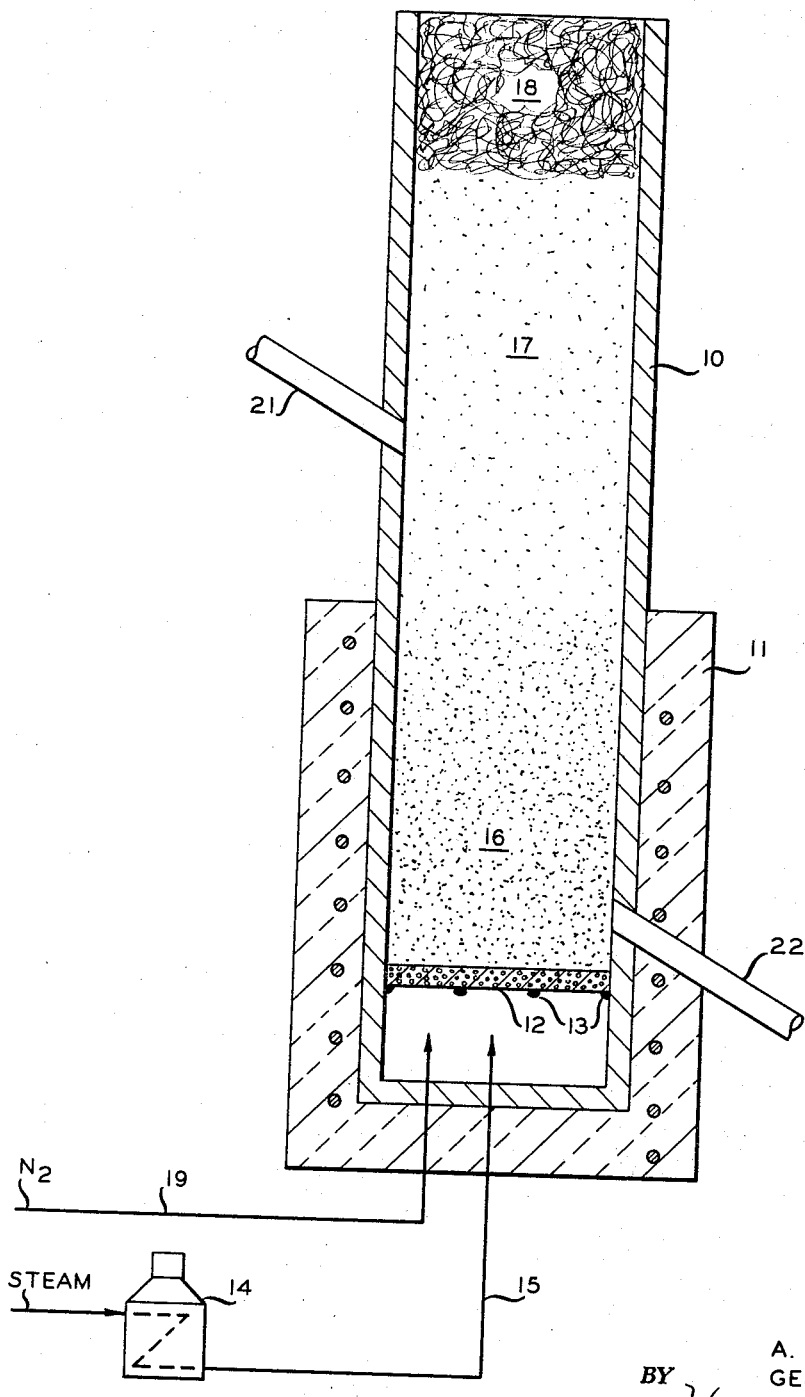
INVENTORS
A. C. TETER
GERARD KRAUS
BY *Young and Quigg*
ATTORNEYS 3,329,626
ACTIVATED FURNACE CARBON BLACK
PRODUCTION
Archie C. Teter and Gerard Kraus, Bartlesville, Okla., assignors to Phillips Petroleum Company, a corporation of Delaware
Filed Mar. 22, 1965, Ser. No. 441,634
3 Claims. (Cl. 252—445)

This invention relates to the production of activated furnace carbon black. In one aspect this invention relates to a method for activating furnace carbon black. In another aspect this invention relates to active carbon produced from furnace carbon black. In still another aspect this invention relates to a catalytic method for activating furnace carbon black and to the catalyst for promoting such activation.

Activated carbon is an amorphous form of carbon having a very large surface area ranging from about 300 to 2000 square meters per gram (m.$^2$/g.) and having a highly developed internal pore structure. Liquid phase activated carbons, e.g., decolorizing carbons, have relatively large internal pores and are often used in powder form. Gas phase or vapor adsorbent carbons have relatively small internal pores and are generally used in the form of hard dense pellets or granules. Adsorptive property for liquids is conveniently indicated by methylene blue adsorption values and adsorptive property for gases is conveniently indicated by carbon tetrachloride adsorption activity. Surface area is conveniently determined by the low temperature adsorption of nitrogen. Thus, the methylene blue and carbon tetrachloride values provide an indication of the type of adsorption that can be expected from a particular carbon and the surface area value provides an indication of the capacity of the black for the particular type of adsorption expected.

Activated carbon has been produced by treating various types of materials including lignite, coal, bone char, vegetable matter and other carbonaceous materials with an oxidizing gas at high temperature. Generally, the starting matter is charred by calcining prior to activation at high temperature with steam, carbon dioxide, or air.

We have found that activated carbon can be produced from furnace carbon blacks by steam treating selected furnace carbon blacks in the presence of a catalyst. Catalysts applicable for activating furnace carbon blacks include the halides and sulfates of the alkali metals and the alkaline earth metals, e.g., the halides and sulfates of lithium, sodium, potassium, calcium, strontium, and barium. The chlorides, bromides, iodides, and fluorides of the above metals can be used in the practice of this invention. Potassium chloride is the preferred catalyst for activation of furnace carbon black because this salt exerts a far greater catalytic effect on the activation reaction than any of the other catalysts under activating conditions of time and temperature.

Furnace carbon black has several advantages over other forms of carbon as the starting material for the preparation of activated carbon. The properties of a furnace black can be closely controlled as to particle size, structure and surface area whereas very little control can be exerted in the preparation of other forms of carbon. Since these properties have an effect on the adsorptive properties of activated carbon, considerable control over the quality of the activated carbon is possible when a furnace black is utilized as the starting material. Ease of activation and economy of operation contribute to the feasibility of preparing activated carbon from furnace carbon black.

When preparing activated carbon it is often desirable to have the carbon black in the form of dense, firm pellets. Pellets of much greater density can be prepared from furnace black, particularly low structure blacks than can ordinarily be obtained from other forms of carbon such as channel black. Hardness of pellets can be controlled by controlling the initial structure of the carbon black and also by choice of the binder used in the pelleting operation. Materials that are easily charred and converted to carbon and are thus suitable as binders include molasses, sugar, pitch, lignin, sulfonated lignin, chlorinated rubber and other high polymers. The binder is activated during the process and becomes a part of the final product. If the pelleting is carried out in aqueous medium, the binder should be water soluble or water dispersible. If the activation catalyst is water soluble, the catalyst can be dissolved in the water used in the pelleting operation. If the catalyst is not water soluble, the finely ground catalyst can be mixed with the carbon black prior to, or simultaneously with, the pelleting operation. Carbon black pelleting is well known and is a conventional step in the production of furnace carbon black. A system for producing, pelleting and drying furnace carbon black is shown in U.S. Patent 3,075,829, issued Jan. 29, 1963, to B. F. Latham, Jr. et al.

Activation of pelleted furnace black is conducted at an elevated temperature, for example, about 675 to 1000° C. in the presence of steam. Gas that contains water vapor can also be employed, e.g., tail gases, burner vapors, and stack gas from carbon black plants. Oxygen can be present in the stream but is not necessary. Activation time is dependent upon temperature and can vary in the range of about 5 minutes to 4 hours but generally activation will be accomplished at a temperature of about 750 to 900° C. in a time range of about 15 minutes to 3 hours.

The amount of activation catalyst utilized will generally be in the range of about 0.5 to 10 weight percent based on the carbon black and the preferred range is about 1 to 5 weight percent based on the black because satisfactory activation can usually be obtained with such amount of catalyst at economical temperature and time conditions.

The furnace carbon black utilized for production of activated carbon according to the invention should have a surface area of at least about 40 m.$^2$/g. and can be as high as 150 m.$^2$/g. or even higher. Usually the furnace carbon black will have a surface area of about 70 to 140 m.$^2$/g. because such furnace blacks are particularly responsive to the activation treatment and can be produced economically in great quantities.

It is an object of this invention to provide a method for producing activated carbon from furnace carbon black. It is also an object of this invention to provide a catalyst for activating furnace carbon black. The provision of an active carbon produced from furnace carbon black is still another object of this invention. Other objects and advantages of the invention will be apparent to those skilled in the art upon studying the disclosure including the detailed description of the invention and the appended drawing wherein:

The sole figure illustrates one apparatus for activating furnace carbon black.

The method employed for activation can be varied. It can be conducted in a fluidized bed as illustrated in the drawing as either a batch or continuous process, in a rotary kiln, in a percolated bed or the like. In the production of furnace carbon black where the carbon black produced in the reactor is wet pelleted and dried, the catalyst can conveniently be incorporated in the pelleting water and activation can be accomplished in the dryer, if the dryer is fabricated of material that is resistant to the activating temperatures and to corrosive action of the catalyst. Pellet dryers are often fabricated from stainless steel and will withstand the temperatures and corrosion encountered in the activating step.

The drawing illustrates one apparatus suitable for treating carbon black by the fluidized bed technique. A cylinder 10 fabricated from suitable material such as stainless steel is positioned substantially vertically in a heating means such as an electric furnace 11. A steam permeable distribution plate 12 is positioned in the lower portion of the cylinder 10 to support the carbon black and to distribute the flow of activating steam. The plate 12 can be supported on lugs 13 secured to the wall of the cylinder 10. Steam, superheated in furnace 14, is passed into the bottom of cylinder 10 and through plate 12 via conduit 15. The flow of steam will partly lift the bed of carbon black in the cylinder 10 to form a dense phase 16 and a light phase 17. A filter 18 in the top of the cylinder 10 prevents loss of carbon black by blowing out of the top of the cylinder. Nitrogen or other inert gas can be introduced into the bottom of cylinder 10 via conduit 19 to cool or heat the bed of carbon black. Raw black can be added via conduit 21 and activated black can be removed via conduit 22.

When conducting the activation process steam, or other gaseous stream containing water vapor, can be introduced to the cold carbon black pellets at the beginning of the activation but subsequent to wetting the pellets with an aqueous solution of the activation catalyst. In an alternate procedure the bed of carbon black can be preheated in an atmosphere of inert gas such as nitrogen and steam introduced after the desired temperature is reached. At the end of the reaction period the activated carbon can be cooled under a flow of steam or inert gas such as nitrogen.

In the process of this invention hydrogen and carbon monoxide are formed and can be burned and used to produce steam and/or heat for the activation step. These gases can also be circulated directly and used in the activation process. Utilization of these waste gases contributes to the economy of operation of this process.

The following examples will be helpful in attaining understanding of the invention but should be considered as illustrative and should not be construed as unduly limiting the invention.

EXAMPLES

Four different pelleted furnace carbon blacks were contacted with an aqueous solution of catalyst and activated by treatment with steam at an elevated temperature. Activation apparatus consisted of a tube made of quartz or stainless steel, mounted vertically. A porous quartz or sintered stainless steel plate, depending upon the type of tube employed, was positoned at the lower part of the tube to provide a means for steam distribution. Preheated steam was introduced at the bottom of the vertically mounted tube at a rate between about 6 and 10 parts by weight/100 parts by weight of carbon/minute. Prior to activation, an aqueous solution of catalyst containing the desired amount of the salt was used to wet the carbon black pellets. Control runs were made without catalyst. Results are shown in the following tables.

TABLE I.—EFFECT OF KCl ON ACTIVATION OF HAF BLACK

| Run No. | KCl, Weight Percent | Time,[1] Hrs. | Temp., °C. | Loss, Weight Percent | S.A.,[2] m.²/g. | M.B.A.,[3] mg./g. | CCl₄ Act.,[4] Percent |
|---|---|---|---|---|---|---|---|
| 1 | | | | | 77 | 10 | 5 |
| 2 | | 3 | 850 | 24 | 258 | | 12 |
| 3 | 1 | 3 | 800 | 35 | 675 | 68 | 38 |
| 4 | 2 | 3 | 800 | 40 | 884 | 170 | 47 |
| 5 | 3.5 | 3 | 810 | 44 | 1,122 | 173 | 60 |
| 6 | 5 | 3 | 825 | 65 | 1,223 | 198 | 81 |

[1] Steam was introduced to cold black in silica reactor. Initial reaction time was taken as time when black bed temperature reached 600° C.
[2] Surface area as described hereinafter.
[3] Methylene blue adsorption as described hereinafter.
[4] Carbon tetrachloride activity as described hereinafter.

Table I shows that KCl catalyzes the activation of furnace carbon black to produce superior active carbon. As little as 2 weight percent of KCl produces active carbon that is superior in surface area, methylene blue adsorption and carbon tetrachloride activity to most commercial active carbons available.

TABLE II.—EFFECT OF TEMPERATURE ON ACTIVATION OF HAF BLACK

| Run No. | KCl, Weight Percent | Time, Hrs. | Temp., °C. | Loss, Weight Percent | S.A., m.²/g. | M.B.A., mg./g. | CCl₄ Act., Percent |
|---|---|---|---|---|---|---|---|
| 1 | 2 | [1] 2 | 750 | 20.7 | 308 | 86 | 22 |
| 2 | 2 | [1] 2 | 825 | 51.4 | 940 | 114 | 38 |
| 3 | 2 | [1] 3 | 760 | 35.2 | 648 | 91 | 26 |
| 4 | 2 | [2] 3 | 800 | 40 | 884 | 170 | 47 |

[1] Steel reactor, preheated with N₂.
[2] Silica reactor, not preheated with N₂.

Table II shows that higher temperature is favorable to activation of furnace black in the presence of KCl.

TABLE III.—EFFECT OF TIME ON ACTIVATION OF HAF BLACK

| Run No. | KCl, Weight Percent | Time,[1] Hrs. | Temp., °C. | Loss, Weight Percent | S.A.,[2] m.²/g. | M.B.A., mg./g. | CCl₄ Act., Percent |
|---|---|---|---|---|---|---|---|
| 1 | | | | | 77 | 10 | 5 |
| 2 | | 1.5 | 825 | 22.4 | 573 | 57 | 15 |
| 3 | | 2.0 | 830 | 39.6 | 269 | 43 | 14 |
| 4 | | 2.5 | 825 | 56.6 | 144 | 20 | 14 |
| 5 | 2 | 2.0 | 750 | 20.7 | 308 | 86 | 22 |
| 6 | 2 | 3.0 | 760 | 35.2 | 648 | 91 | 26 |
| 7 | 2 | 1.0 | 820 | 27.4 | 504 | 80 | 35 |
| 8 | 2 | 1.5 | 825 | 36.6 | 540 | 114 | 42 |
| 9 | 2 | 2.0 | 825 | 51.4 | 940 | 114 | 38 |

[1] Black bed was heated to indicated temperature in steel reactor with N₂ and at end of reaction period was cooled with N₂.

Table III indicates that activation is accomplished in a relatively short time even at the lower activation temperatures when the activation catalysts of the invention are utilized but activation is not accomplished satisfactorily in the absence of the catalyst.

TABLE IV.—EFFECT OF VARIOUS CATALYSTS ON HAF BLACK

| Run No. | Catalyst [1] | Time,[2] Hours | Temp., °C. | Loss, Weight Percent | S.A., m.²/g. | M.B.A., mg./g. | CCl₄ Act., Percent |
|---|---|---|---|---|---|---|---|
| 1 | | | | | 77 | 10 | 5 |
| 2 | | 1.5 | 825 | 22.4 | 573 | 57 | 15 |
| 3 | KCl | 1.5 | 825 | 36.6 | 535 | 114 | 42 |
| 4 | NaCl | 1.5 | 800 | 45 | 370 | 74 | 22.5 |
| 5 | K₂SO₄ | 1.5 | 800 | 62 | 484 | 62 | 24.1 |
| 6 | CaCl₂ | 1.5 | 800 | 76.6 | 430 | 92 | 25.3 |

[1] Equivalent moles of metal ion of 2 weight percent KCl.
[2] Steel reactor, preheated with N₂.

Table IV shows that the halides and sulfates of the alkali metals and alkaline earth metals are effective catalysts for activation of furnace carbon blacks and that KCl is a superior catalyst.

TABLE V.—EFFECT OF FURNACE BLACK ON ACTIVATION

| Run No. | Black | KCl, Weight Percent | Time, Hrs. | Temp., °C. | Loss, Weight Percent | S.A., m.²/g. | M.B.A., mg./g. | CCl₄ Act., Percent |
|---|---|---|---|---|---|---|---|---|
| 1 | FEF | | | | | 44 | | |
| 2 | FEF | 2 | 1.5 | 825 | 32.2 | 310 | 55 | 27.5 |
| 3 | HAF | | | | | 77 | 10 | 5 |
| 4 | HAF | 2 | 1.5 | 825 | 36.6 | 535 | 114 | 42 |
| 5 | ISAF | | | | | 108 | | |
| 6 | ISAF | 2 | 1.5 | 825 | 31.8 | 290 | 69 | 34 |
| 7 | SAF | | | | | 136 | | |
| 8 | SAF | 2 | 1.5 | 825 | 36 | 623 | 74 | 44 |

Table V shown that all types of furnace carbon blacks having surface area of at least about 40 m.²/g. can be activated in the presence of the catalysts of this invention.

Carbon black tests

*Surface area.*—The method using the Brunauer, Emmett, and Teller Theory (B.E.T. method) involving the low temperature adsorption of a mono-molecular layer of nitrogen was employed.

*Methylene blue adsorption.*—The test solution contained 0.8 gram of methylene blue per liter of water. Four samples of carbon weighing 0.1, 0.2, 0.3 and 0.4 gram, respectively, were weighed into 2-ounce bottles fitted with polyethylene sealed caps. Fifty milliliters of dye solution were added to each bottle, the caps sealed, and the bottles allowed to shake at low speed on a laboratory shaker for about 16 hours at room temperature. Ten milliliter aliquots were removed from each and light transmission measured on a Klett-Summerson photometer. Solutions were diluted when necessary to obtain a reading.

The equilibrium concentration of the dye was plotted against the amount of dye adsorbed on log-log paper (Fruendlich isotherm) and the adsorption at an equilibrium concentration of one millimole per liter read off the plot. This value is reported as the methylene blue adsorption.

*Carbon tetrachloride activity.*—A sample of the carbon (5 to 8 grams) was placed in a glass tube (12 mm. I.D. x 250 mm. long) and gross and tare weights recorded. Glass wool was used at either end of the column to prevent loss. Air saturated with CCl₄ at 0° C. was passed through the column and the increase in weight recorded at 5-minute intervals. Adsorption was usually complete in 10 to 15 minutes. The sample was at room temperature during the adsorption. The air was saturated with CCl₄ by passing through a gas scrubber filled with CCl₄ and immersed in an ice bath. The air was passed through the system at approximately 3 cubic ft./hr. The CCl₄ activity was calculated by:

$$\text{CCl}_4 \text{ activity} = \frac{\text{Wt. of CCl}_4 \text{ adsorbed}}{\text{Wt. of carbon}} \times 100$$

That which is claimed is:

1. A process for activating furnace carbon black which comprises treating pellets of furnace carbon black with about 0.5 to 10 weight percent of potassium chloride; and contacting the carbon black and catalyst with steam at a temperature of about 675 to 1000° C. for about 5 minutes to 4 hours.

2. A process for producing active carbon black which comprises treating furnace carbon black with steam at a temperature of about 675 to 1000° C. for about 5 minutes to 4 hours in the presence of about 0.5 to 10 weight percent based on the carbon black of potassium chloride.

3. A process for increasing the activity of furnace carbon black which comprises treating furnace carbon with an activating amount of potassium chloride; intimately contacting the treated black with steam at a temperature in the range of about 750 to 900° C.; periodically determining the activity of samples of the black; and continuing the steam treatment until the desired activity of the black is achieved.

References Cited
UNITED STATES PATENTS 1,502,592 7/1924 Sauer _____ 252—425 X
1,819,314 8/1931 Zurcher _____ 252—445
1,968,846 8/1934 Morrell _____ 252—445 X OSCAR R. VERTIZ, *Primary Examiner.*

MILTON WEISSMAN, *Examiner.*

A. J. GREIF, *Assistant Examiner.*